(12) United States Patent
Williams et al.

(10) Patent No.: US 8,176,416 B1
(45) Date of Patent: May 8, 2012

(54) SYSTEM AND METHOD FOR DELIVERING A DEVICE-INDEPENDENT WEB PAGE

(75) Inventors: Brian R. Williams, Huntersville, NC (US); Carl Lee Wilson, Jr., Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 829 days.

(21) Appl. No.: 11/276,892

(22) Filed: Mar. 17, 2006

(51) Int. Cl.
*G06N 3/00* (2006.01)

(52) U.S. Cl. .......................................... 715/243

(58) Field of Classification Search .................. 715/234, 715/243, 254, 255, 864
See application file for complete search history.

(56) References Cited

U.S. PATENT DOCUMENTS

| | | | |
|---|---|---|---|
| 6,336,124 B1 * | 1/2002 | Alam et al. ................... 715/205 |
| 6,605,120 B1 | 8/2003 | Fields et al. |
| 6,836,886 B2 | 12/2004 | Tuerke et al. |
| 6,857,102 B1 | 2/2005 | Bickmore et al. |
| 6,886,013 B1 | 4/2005 | Beranek |
| 6,886,132 B1 | 4/2005 | Hall et al. |
| 2001/0047394 A1 | 11/2001 | Kloba et al. |
| 2002/0059344 A1 | 5/2002 | Britton et al. |
| 2002/0091738 A1 | 7/2002 | Rohrabaugh et al. |
| 2002/0194219 A1 | 12/2002 | Bradley et al. |
| 2003/0233620 A1 | 12/2003 | Vedullapalli et al. |
| 2003/0237053 A1 | 12/2003 | Chen et al. |
| 2004/0031058 A1 | 2/2004 | Reisman |
| 2004/0049737 A1 | 3/2004 | Hunt et al. |
| 2004/0073873 A1 | 4/2004 | Cromey et al. |
| 2004/0103370 A1 | 5/2004 | Chiang et al. |
| 2004/0103371 A1 | 5/2004 | Chen et al. |
| 2004/0107403 A1 | 6/2004 | Tetzchner |
| 2004/0133848 A1 | 7/2004 | Hunt et al. |
| 2004/0205553 A1 | 10/2004 | Hall et al. |
| 2004/0205566 A1 | 10/2004 | Aggarwal et al. |
| 2004/0205588 A1 | 10/2004 | Purvis et al. |
| 2004/0212635 A1 | 10/2004 | Mussini |
| 2004/0230901 A1 | 11/2004 | Godwin et al. |
| 2004/0255244 A1 | 12/2004 | Filner et al. |
| 2005/0050461 A1 | 3/2005 | Hall et al. |

(Continued)

OTHER PUBLICATIONS

Raggett, Dave, "Adding a touch of style," Apr. 8, 2002, <http://www.w3.org/MarkUp/Guide/Style>, pp. 1-13.*

(Continued)

*Primary Examiner* — Kyle Stork
(74) *Attorney, Agent, or Firm* — Womble Carlyle Sandridge & Rice LLP

(57) ABSTRACT

A method and system for presenting a document to a plurality of media device types optimized for the display medium. A document is generated in a markup language, and a plurality of style sheets are provided for formatting the document for a requesting device, with each style sheet accommodating a distinct display environment. The markup elements that reference two separate cascading style sheets (CSS) are configured differently such that they isolate the CSS reference for either high-resolution graphical display devices or small screen, low-resolution graphical display devices. A third style sheet is used as an intermediary to pass a CSS reference to small screen browsers while at the same time, shielding the CSS reference from certain high resolution browsers incapable of parsing the syntax of the reference. When a request for the document is received, the display environment of the requesting device is determined and a plurality of document presentation attributes are automatically transformed for the determined display environment. The formatted document is then delivered to the requesting device.

67 Claims, 6 Drawing Sheets

U.S. PATENT DOCUMENTS

2005/0076292 A1     4/2005    Tetzchner et al.
2006/0031759 A1*   2/2006    Brown et al. ................. 715/514

OTHER PUBLICATIONS

"Cascading Style Sheets, level 1," Jan. 11, 1999, <http://www.w3.org/TR/1999/REC-CSS-1990111>, pp. 1-70.*

Niederst, Jennifer, "Web Design in a Nutshell: A Desktop Quick Reference, 2nd Edition," O'Reilly Media, Sep. 2001, pp. 292-295.*

W3C:HTML 4 Spec—Media Descriptors (http://www.w3.org/TR/html401/types.html-h-6.13, at least as early as May 11, 2005.

W3C:HTML 4 Spec—External Style Sheets (http://www.w3.org/TR/html401/present/styles.html-style-external), at least as early as May 11, 2005.

W3C:HTML 4 Spec—Specifying External Style Sheets (http://www.w3.org/TR/htmI401/present/styles.html—specifying-external), at least as early as May 11, 2005.

W3C:Media types (http://www.w3.org/TR/REC-CSS2/media.html), at least as early as May 11, 2005.

W3C:CSS Specification (http://www.w3.org/Style/CSS/), at least as early as May 11, 2005.

Stop Design: Targeting Small Screens (http://www.stopdesign.com/log/2004/12/16/small-screens.html), at least as early as May 11, 2005.

Opera: Making Small Devices Look Great (http://my.opera.com/community/dev/device/css-media/), at least as early as May 11, 2005.

* cited by examiner

SYSTEM AND METHOD FOR DELIVERING A DEVICE-INDEPENDENT WEB PAGE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention is related generally to delivery of web pages to multiple device types and, more particularly, to the delivery of web pages that are optimized for the display medium.

Prior art methods for delivering web pages to an electronic computing device, such as personal computers, workstations, or handheld devices, relied upon scripted logic that dynamically modified the markup instructions delivered to the browser through detection of the Hypertext Transfer Protocol (HTTP) or browser environment variables. In one scenario, device type detection takes place on the server when a page request is received. Depending on which device type is detected, the requested page is processed to include Hypertext Markup Language (HTML) code that is uniquely suited to the requirements of the requesting device. A disadvantage of this prior art method is that it places additional processing burden on the application server executing the detection, compromising the performance of the server. In another prior art method, device detection takes place through the use of a client-side scripting language. In this method, a script is passed to the browser along with the requested HTML code. The processed script parses the HTTP environment variables and modifies the HTML instructions the browser uses to render the page. A disadvantage of this method is that it requires a device that is capable of processing client-side script. A device that does not have client side scripting capability, or if such scripting capability has been disabled by the device owner, will not process the HTML code appropriately and will not render the intended presentation.

Most web sites that are created are written for, and tested on, desktop computers with large color monitors. Typically, web sites are designed with fixed widths (e.g., 468 pixel wide center column) that make them difficult to view and navigate on small screen devices. To read an article on a small screen device, the user would have to scroll back and forth horizontally for each line of text. Small screen browsers reformat the page to fit inside the screen width and eliminate horizontal scrolling. Only the layout of the page changes; the content and functionality remains the same.

The same HTML web page can be presented for different media by using Cascading Style Sheets (CSS). The present invention is intended to address the need to deliver media-optimized Cascading Style Sheets. An important feature of style sheets is that they specify how a document is to be presented on different media. Style sheets for different media types may share a property, but require different values for that property. For handheld style sheets, the CSS properties max-width and max-height are very useful, the screen width of most PDAs typically being 240 pixels. There are two ways to specify media dependencies for style sheets. The first is to specify the target medium from a style sheet with the @media or @import attributes. The second is to specify the target medium within the document language.

The @media rule specifies the target media types of a set of rules. The @media construct allows style sheet rules for various media in the same style sheet. A CSS media type names a set of CSS properties. Recognized media types include "all," "handheld," "print," and "screen" among others. The "all" media type means suitable for all devices. The "handheld" media type is intended for handheld devices having small monochrome screens and limited bandwidth. The "print" media type is intended for documents viewed on screen in print preview mode. "Screen" is intended for color computer screens. Each CSS property definition specifies the media types for which the property must be implemented by a conforming user agent. Each property applies to all media types in the media groups listed in its definition.

The @import rule allows users to import style rules from other style sheets. The @import rules must precede all rule sets in a style sheet. The @import keyword must be followed by the Uniform Resource Locator (URL) of the style sheet to include. Imported style sheets also cascade and their weight depends on their import order. Rules that are specified in a given style sheet override rules imported from other style sheets.

SUMMARY OF THE INVENTION

The invention is directed to a method of serving a single web page to both a desktop computer browser and a handheld device browser that controls the presentation properties of each independently through the application of two separate Cascading Style Sheets (CSS). The method requires that each of the two markup elements which reference the CSS be configured differently such that they isolate the CSS reference for either high-resolution graphical display devices or small screen, low-resolution graphical display devices. A third style sheet is used as an intermediary to pass a CSS reference to small screen browsers while at the same time, shielding the CSS reference from certain high resolution browsers incapable of parsing the syntax of the reference.

The present invention provides a time-saving and cost-effective technique for meeting the web accessibility needs of the emerging handheld browser market that alleviates the burden of managing unique presentational markups that are different for multiple device types, and that do not depend on either server-side or client-side scripting technologies. The method of the invention makes it possible to deliver a single document to all devices that automatically transform its presentation attributes to suit the display environment.

In one aspect of the invention, a method is provided for presenting a document generated in a markup language to a plurality of device types. A plurality of style sheets are provided for formatting the document for a requesting device, with each style sheet accommodating a display environment. When a request for the document is received, the display environment of the requesting device is determined and a plurality of document presentation attributes are automatically transformed for the determined display environment. The formatted document is delivered to the requesting device.

In another aspect of the invention, a system is provided for presenting a document generated in a markup language to a plurality of device types. The system includes a component that provides a plurality of style sheets for formatting the document for a requested device, with each style sheet accommodating a display environment. The system also includes a component that receives a request for the document; a component that determines the display environment of the requesting device; a component that automatically transforms a plurality of document presentation attributes to format the document for the display environments; and a component that delivers the formatted document to the requesting device.

In yet another aspect of the invention, a computer program product is provided for presenting a document generated in a markup language to a plurality of device types. The computer program product comprises a computer readable medium having computer readable code embedded therein. The computer readable medium includes program instructions that provide a plurality of style sheets for formatting the document for a requesting device, with each style sheet accommodating a display environment. The computer readable medium further includes programming instructions that receive a request for the document; program instructions that determine the display environment of the requesting device; program instructions that automatically transform a plurality of document presentation attributes to format the document for the display environment; and program instructions that deliver the formatted document to the requesting device.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

Figure 1B:
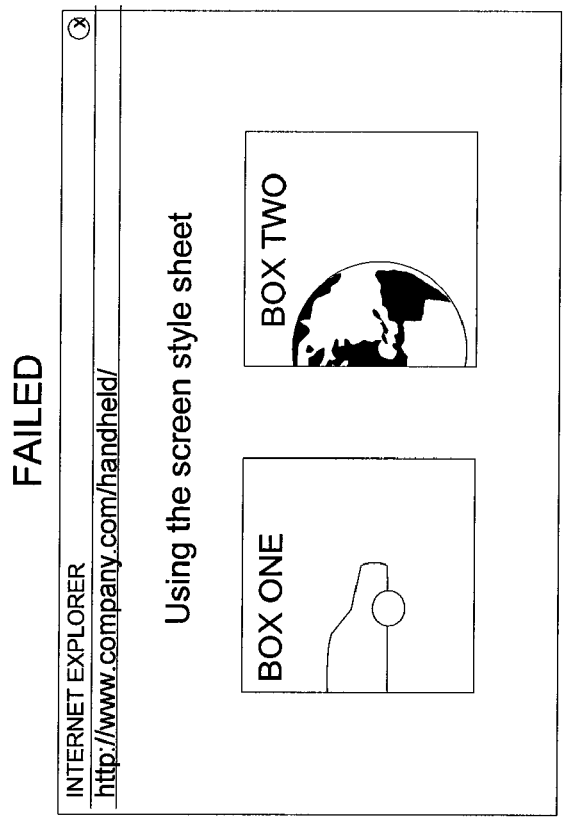
FIGS. 1A-1B illustrate screen shot simulations that could appear in a handheld device browser for successful and failed handheld browser tests using the method of the present invention.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

The invention is directed to a method of serving a single web page to both a desktop computer browser (hereafter referred to as "high resolution browser" or "hi-res browser") and a handheld device browser (hereafter referred to as "small screen browser" or "SSB") that controls the presentation properties of each independently through the application of two separate cascading style sheets. A third style sheet is used as an intermediary to pass a CSS reference to small screen browsers while at the same time, shielding the CSS reference from certain high resolution browsers incapable of parsing the syntax of the reference. The method requires that references to style sheets, other than the intermediary style sheet, be configured differently such that they isolate the CSS reference for one of two media types: (1) high-resolution graphical display devices such as desktops, notebooks, and tablet PCs; and (2) small screen, low-resolution graphical display devices such as handheld devices and smart phones.

The configuration of the two markup elements is accomplished through the following set of syntax rules:

1. The HTML <link> element (with the href attribute designating the location of a specific CSS document) is used to reference the style sheet intended for high-resolution browsers. The "link" element is for using an external style sheet.
2. The HTML <link> element includes a media attribute, the value of which is "screen."
3. The HTML <style> element (with @import notation designating the location of a CSS document) is used to reference an intermediary style sheet.
4. The intermediary style sheet contains only a reference to a style sheet intended for SSBs through @import notation designating the location of the CSS document.
5. The @import notation in the intermediary style sheet includes the keyword "handheld" for media attribution targeting SSBs.
6. The @import notation in the intermediary style sheet is preceded by a single forward slash character (/) which, when parsed by certain hi-res browsers, renders all subsequent CSS code in the document non-executable, preventing access to the SSB style sheet.
7. In the originating HTML document, a second HTML link element (with the href attribute designating the location of a specific CSS document) is used to reference the style sheet intended for SSBs.
8. The second HTML link element includes a media attribute, the value of which is "handheld".

The invention provides a web presentation layer coding technique that utilizes a combination of elements and attributes of HyperText Markup Language (HTML) and Cascading Style Sheet (CSS) notation to deliver multiple configurations of visual formatting instructions (style sheets) to a web browser for the presentation of a web page. Although the invention as described utilizes HTML, the concepts described are also applicable to documents using other markup languages including, but not limited to, Extensible Markup Language (XML), Extensible HTML (XHTML), and Dynamic HTML (DHTML). Which style sheets are applied to a web page is based upon the type of hardware the browser is installed on (referred to herein as "media type"), i.e. desktop/laptop or handheld/mobile device. When determining whether to apply the presentation properties of a style sheet, the browser interprets the declared media attributes (if present) indicated in the reference instructions, which appears as either the value of an attribute named in the HTML link element, or as a keyword contained in CSS @import notation. If the media attribute matches the media type of the client device, or if no media attribute is present, the browser applies the style sheet to the page. This technique also prevents certain high resolution browsers from incorrectly parsing the CSS @import notation used to reference the style sheet optimized for small screen browsers.

Figure 1A:
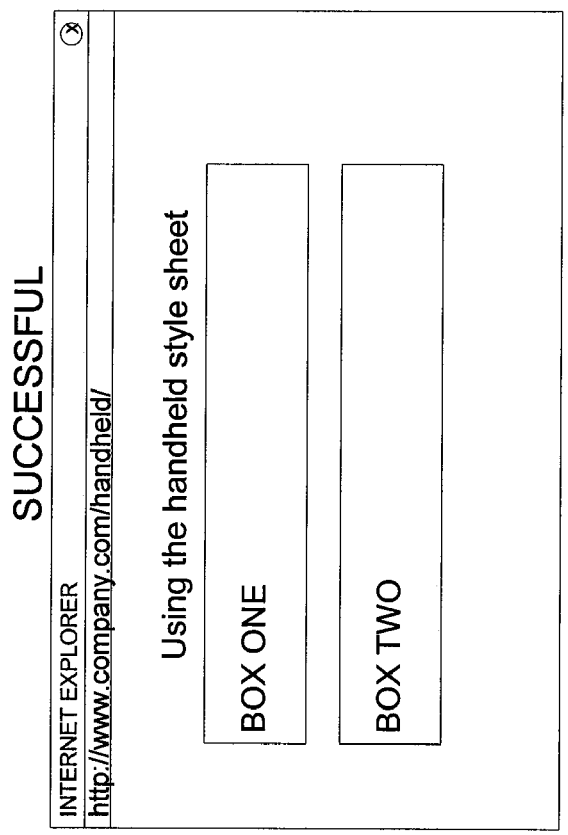

The method of the present invention was tested on a plurality of devices having high-resolution browsers and a plurality of devices having small screen browsers. The purpose of the test suite was to identify the correct methods of serving a singe web page to both a screen browser and a handheld browser that affords absolute control over the presentation properties of each browser type independently through the application of two separate cascading style sheets, each configured for one device type via the media type designation in the corresponding markup language. The methodology tested all combinations of the markup elements link and style (using @import notation) along with the associated media attribute that can be used to link to two external style sheets, where (a) one style sheet includes presentation instructions intended only for screen browsers; (b) one style sheet includes presentation instructions intended only for handheld browsers; and (c) the style sheet configured for handheld devices is utilized successfully on browsers running on both Palm and Windows Mobile platforms for smart phones and wireless fidelity (WiFi) personal digital assistants (PDAs). FIGS. 1A-1B illustrate screen shot simulations that could appear in a handheld device browser for successful and failed handheld browser tests using the method of the present invention.

In order to test successfully, a handheld device must utilize the style sheet configured for handhelds either exclusively, or retroactively, to overrule the style declarations written in the screen-optimized style sheet. The combinations tested were based on the following variables:
1. element type (style or link);
2. degree of specificity based upon position in source order;
3. degree of specificity through the use of "any element" selector (*) on individual style rules;
4. prioritization through the use of the !important keyword on individual style properties;
5. placement of media declaration if style element is used:
    a. as an attribute of the style element, e.g., <style type="text/css" media=handheld>
    b. as the object of the style element, e.g., <style type="text/css">@import url ("handheld css") handheld; </style.

The markup and style sheets used in the test pages are as follows:
Markup
    <div id="parent">
    <p class="screen">Using the <strong>screen</strong>style sheet</p>
    <p class="handheld">Using the <strong>handheld</strong>style sheet </p>
    <div id="main">
        <p>Box One</p>
    </div>
    <div id="nav">
        <p>Box Two</p>
    </div>
    </div>
Screen Style Sheet
    #main{
    float: left;
    width: 45%;
    height: 100 px;
    border: solid 1 px red;
    background-color: #ccc;}
    body*{font-size: small;}
    .redgreen.screen {display: block;}
    .redgreen.handheld {display: none;}
    #nav {
    margin-left: 50%;
    height: 100 px;
    border: solid 1 px red;
    background: red url (bg.gif) no-repeat;}
Handheld Style Sheet
    .redgreen.screen {display: none;}
    .redgreen.handheld {display: block;}
    #main {
    float: none;
    width: auto;
    height: auto;
    border-color: green;
    background-color: transparent;}
    #nav{
    margin: auto;
    height: auto;
    border-color: green;
    background-color: #fff;
    background-image: none;}

Tables 1 and 2 below provide a listing of small screen browsers and high-resolution browsers, respectively, that are supported in an exemplary embodiment of the invention. This listing does not limit the invention in any way. New handheld devices and other electronic devices including browsers (e.g., Sony PlayStation portable electronic gaming device, TREO handhelds) continue to be developed and introduced to the appropriate consumer or business market on an almost daily basis. The invention should be operative with most such devices.

TABLE 1

| Small Screen Browser | Operating System |
|---|---|
| Pocket IE | Windows Mobile 2003SE |
| Pocket IE | Windows Mobile PPC 2002 |
| Blazer 3.x | Palm OS v5.2.x |
| Blazer 4.x | Palm OS "Garnet" v5.4.x |
| WebBrowser 2.0 | Palm OS v5.2.x |
| RIM Blackberry | RIM |
| Motorola Razr V3 | Linux |
| Opera 6.2 | Windows Mobile 2003SE |

TABLE 2

| High-Resolution Browser | Windows 98, ME, 2000, XP | Macintosh OS X 10.1, 10.2, 10.3 |
|---|---|---|
| Microsoft Internet Explorer | 5.5, 6.0, 7.0 | N/A |
| Netscape | 7.1 and 7.2 | 7.1 and 7.2 |
| Firefox | 1.0-1.5 | 1.0-1.5 |
| America Online | 8 and 9 | AOL for Mac OS X |
| Safari | N/A | 1.2 {OS X 10.3 Only} |

A number of device idiosyncrasies were discovered through testing of a cross-sample of hardware and software configurations:
1. Certain browsers or devices will always ignore a style sheet called from the <link> element. These include WebBroswer 2.0 (as tested on a Palm Tungsten C); Blazer 3.0 (as tested on a Palm Treo 600); and Motorola Razr V3.
2. Certain browsers ignore style sheets called from any <style> element that includes a media attribute. These include WebBroswer 2.0 and Blazer 3.0.

3. The @media keyword, when used within the <style> element, causes Blazer 4.0 to freeze.
4. Declaring the media type within the @import notation of a <style> element (e.g., @import url ("handheld.css") handheld;) causes Internet Explorer for Windows for the desktop to misinterpret the URL string resulting in logged '404' errors. For the string @import url ("handheld.css") handheld; inspection of the server log will reveal that Internet Explorer for Windows requests/url ("handheld.css")+handheld from the server rather than handheld.css.
5. Within a CSS document, adding a forward slash (/) to the beginning of the @import notation forces Internet Explorer for Windows (high resolution versions) to abandon all subsequent instructions contained in the document. Internet Explorer treats the forward slash as delimiting a comment in the style sheet.

The following HTML coding sequences will generate the appropriate style sheets for high-resolution browsers and small screen browsers. The purpose of intermediary style sheets is explained below.

<link href="screen.css" rel="stylesheet" type="text/css" media="screen"/>
<style type="text/css">
@import url ("interference.css");
</style>
<link href="handheld.css" rel="stylesheet" type="text/css" media="handheld"/>

Figure 2:
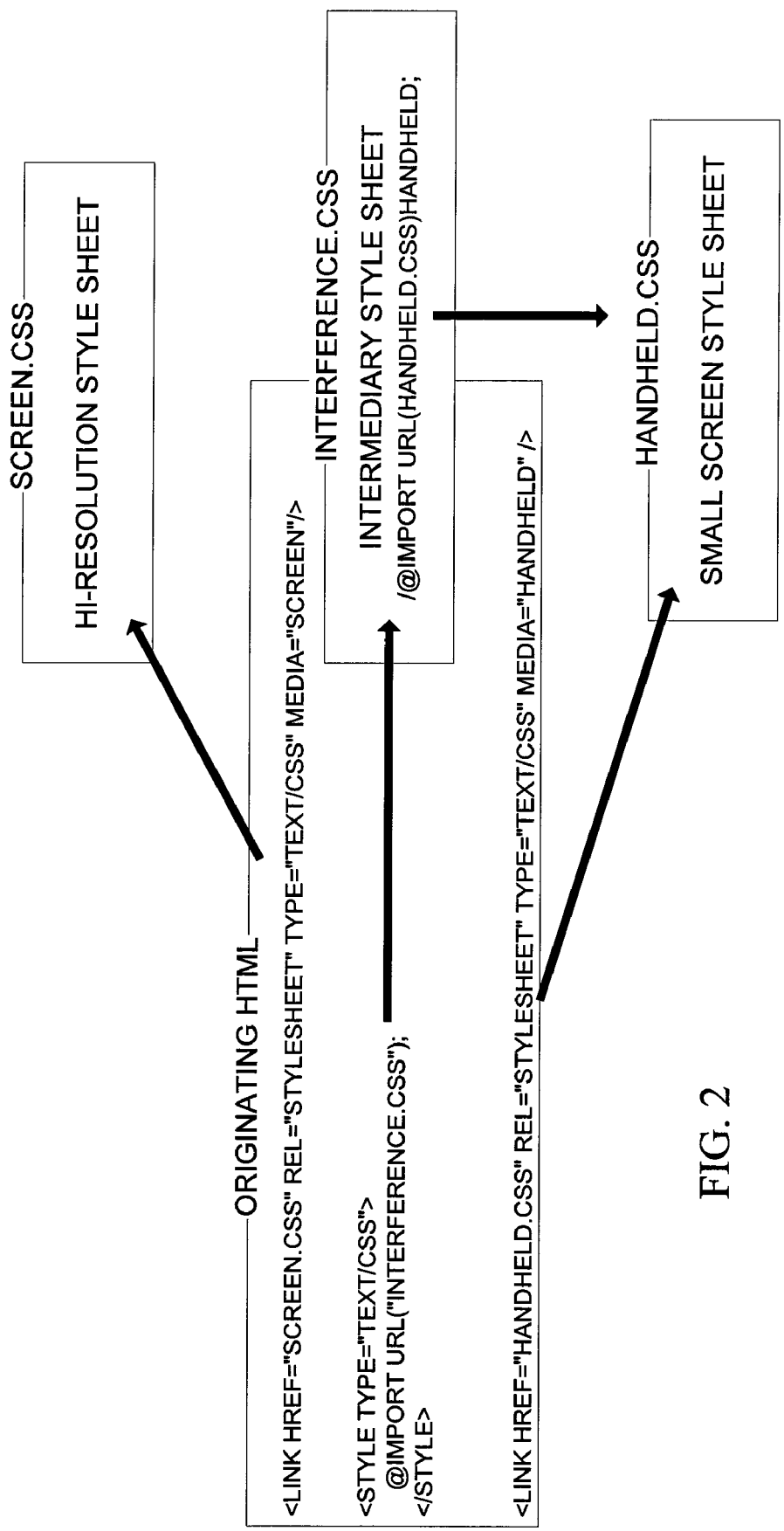
FIG. 2 illustrates a CSS access diagram including the originating HTML code that generates a high-resolution style sheet, an intermediary style sheet and a small screen style sheet in accordance with an exemplary embodiment of the invention.

In the preceeding HTML, "interference.css" contains the following CSS notation:

/@import url (handheld.css) handheld;

FIG. 2 illustrates a CSS access diagram including the originating HTML code that generates a high-resolution style sheet, an intermediary style sheet and a small screen style sheet corresponding to the above coding sequences.

Figure 3:
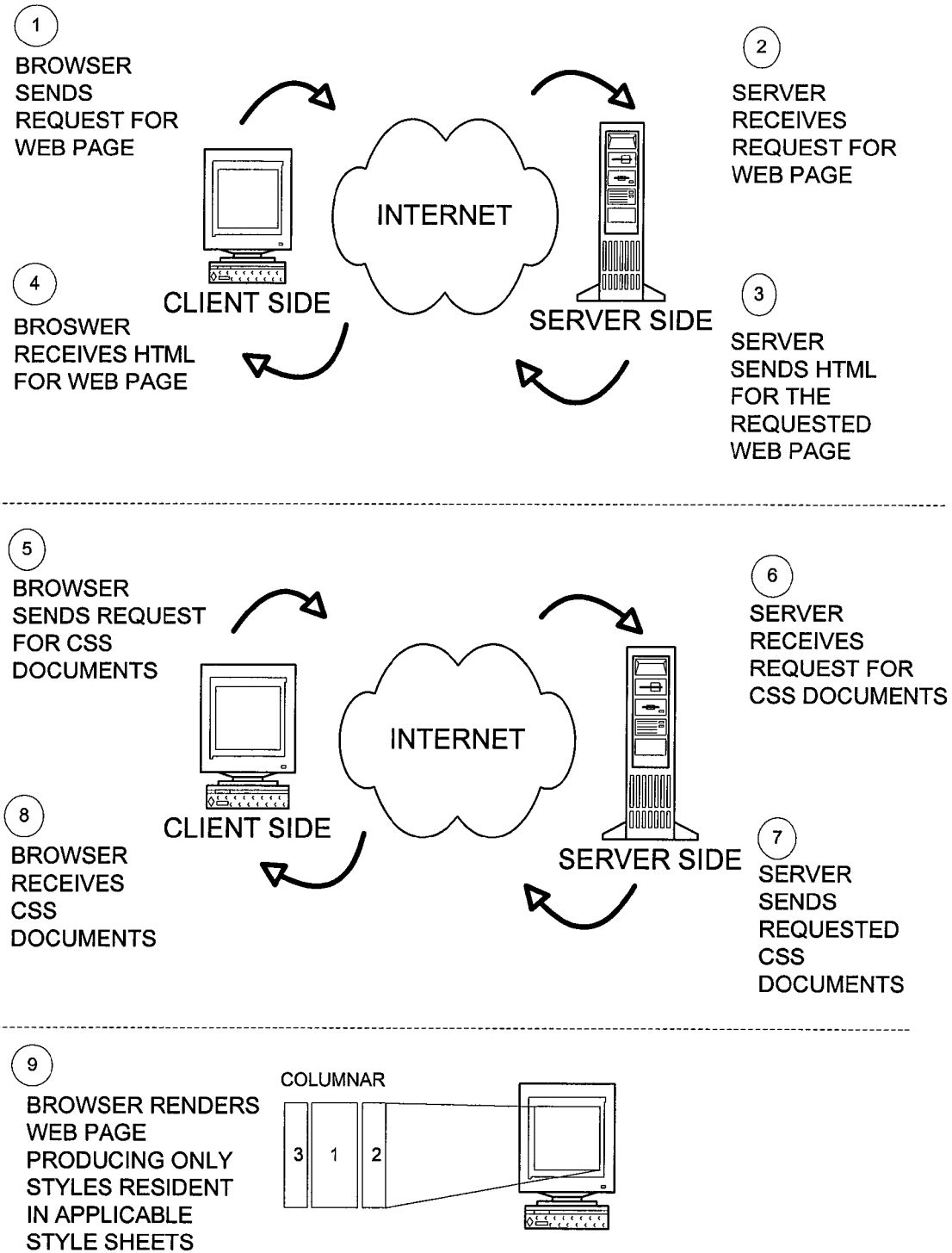
FIG. 3 illustrates a sequence of steps for rendering a web page to a high resolution browser in accordance with an exemplary embodiment of the invention.

FIG. 3 illustrates a sequence of steps for rendering a web page for a high resolution browser. For a high resolution browser, except Microsoft Internet Explorer for Windows, the browser request utilizes only CSS documents where either the HTML media attribute is equal to "screen," or no media attribute is declared. In this technique, the reference to "screen.css" includes media="screen," and the reference to "interference.css" contains no media attribute. Therefore, both style sheets are utilized by the browser. Although "interference.css" contains a subsequent CSS style sheet reference, either the forward slash or its handheld media type attribution prevent any action from being taken by the high resolution browser.

For a Microsoft Internet Explorer for Windows browser, the browser is fed both the high-resolution style sheet, as well as an innocuous reference to a second style sheet via the style element, where the media type is not attributed. This second style sheet named "interference.css" begins with a forward slash character (/), which effectively prevents Internet Explorer for Windows from parsing all the subsequent code contained in the document. The notation of the code following the forward slash is specifically intended for a small subset of handheld browsers.

Referring to FIG. 3, the client browser sends an HTTP request for a web page to a server over the Internet in step 1. The server receives the HTTP request for the web page in step 2, and sends the HTML for the requested web page back to the client browser in step 3. The client browser receives the HTML for the web page and parses the HTML in step 4. The browser sends subsequent HTTP requests to the server for referenced style sheets (i.e., CSS documents) where the media type is "screen" or the media type is undeclared in step 5. The server receives the requests for CSS documents in step 6. The server then sends the requested CSS documents back to the client in step 7. The client browser receives the CSS documents in step 8. The CSS documents are parsed by the client and any reference to an additional style sheet within "interference.css" is disregarded upon encountering either the forward slash at the beginning of @import notation (e.g., Internet Explorer for Windows) or the handheld media attribution. For received style sheets, if the media type is undeclared, or if the declared media type is "screen," priority is computed for style rules based on specificity of selector and/or the order specified in the HTML. The high resolution browser renders the web page in step 9 producing only styles resident in applicable style sheets. For these purposes, "screen.css" produces a columnar presentation of web page content.

Figure 4:
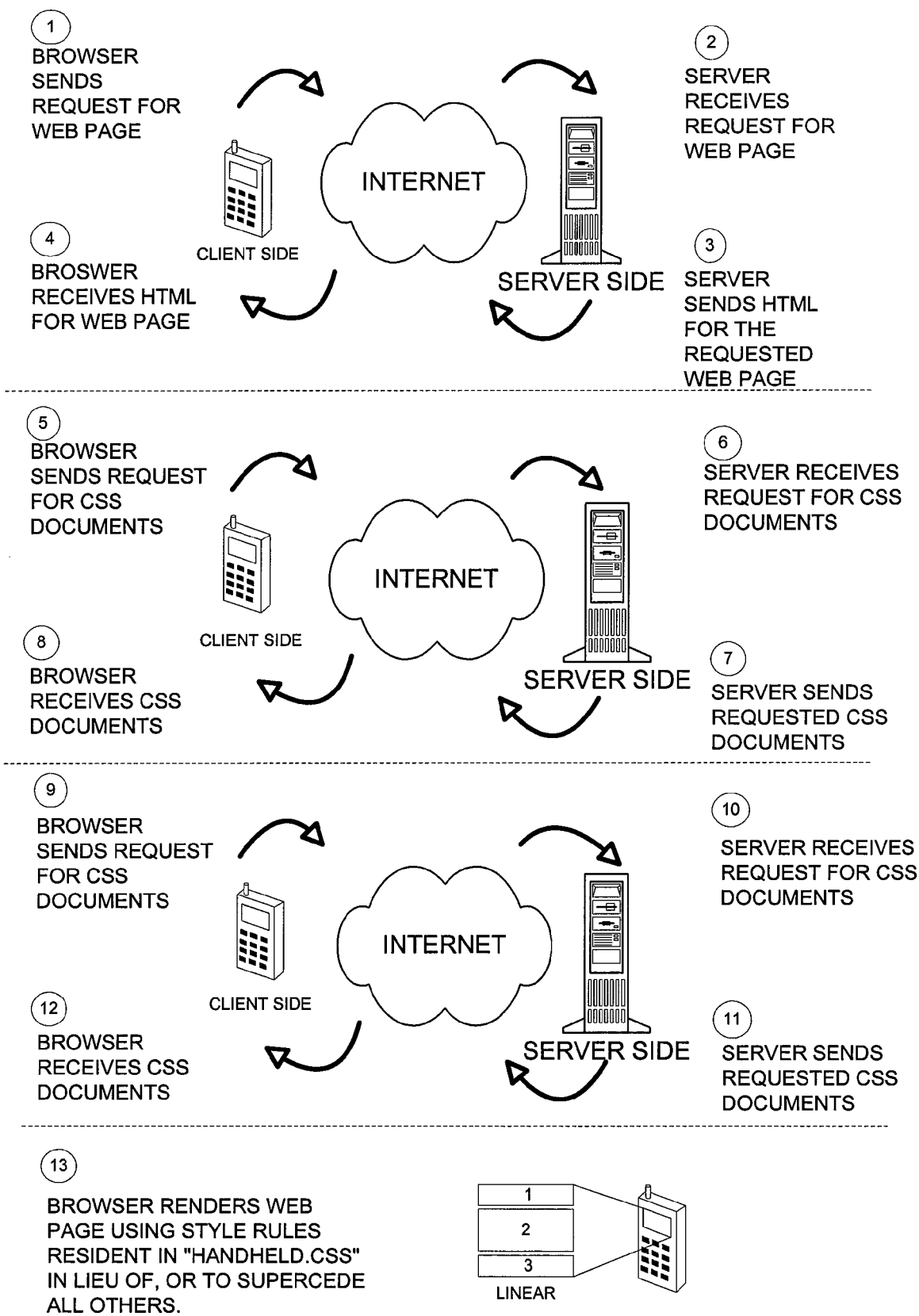
FIG. 4 illustrates a sequence of steps for rendering a web page to a small screen browser that cannot use the HTML <link> element to retrieve a style sheet.

FIG. 4 illustrates a sequence of steps for rendering a web page to a small screen browser (SSB) that cannot use the HTML <link> element to retrieve a style sheet. Tested browsers in this category are WebBrowser 2.0, Blazer 3.0, and Motorola Razr v3. The method targets handheld browsers that are incapable of accessing a style sheet reference via the link element, and that also will ignore the media attribute of the style element. In this method, the media type specification is moved from the attribute position of the referencing style element to a position inside the @import notation contained in the referenced CSS document. Placing the media attribute within the notation of an @import declaration is the only way of providing a small subset of handheld browsers with a media-specific style sheet, while at the same time preventing parsing errors by Internet Explorer for the PC.

While it is possible to apply the method directly within the @import notation of the style element in the originating markup language, doing so causes Internet Explorer for Windows to generate '404' errors in the server's log file due to its inability to accurately parse the @import notation when it includes the media declaration. Therefore, the handheld media declaration is moved to a second @import occurring inside an intermediate style sheet. The purpose of this intermediate style sheet is to effectively "interfere" with Internet Explorer for Windows, and thus is named "interference.css" in the present invention.

Referring to FIG. 4, the client browser (SSB) on the handheld device sends an HTTP request for a web page to a server in step 1, which is received at the server in step 2. The server sends the HTML for the requested web page to the client browser in step 3. The client browser receives the HTML for the web page and parses the HTML in step 4. The client browser sends subsequent requests for referenced style sheets in step 5. The server receives the HTTP request for CSS documents in step 6 and sends the requested CSS documents to the client browser in step 7. The client browser receives the CSS documents and parses the CSS in step 8. The client browser sends requests for additional style sheets referenced in "interference.css" to the server in step 9. The server receives the request for the CSS documents referenced in "interference.css" in step 10 and sends the requested CSS documents to the client in step 11. The client browser receives the CSS documents, parses the CSS and computes priority for style rules based upon specificity of selector and the order specified in the HTML in step 12. The client browser renders the web page in step 13 using style rules resident in "handheld.css" in lieu of, or to supercede all others. For these purposes, "handheld.css" produces a linear presentation of web page content.

Figure 5:
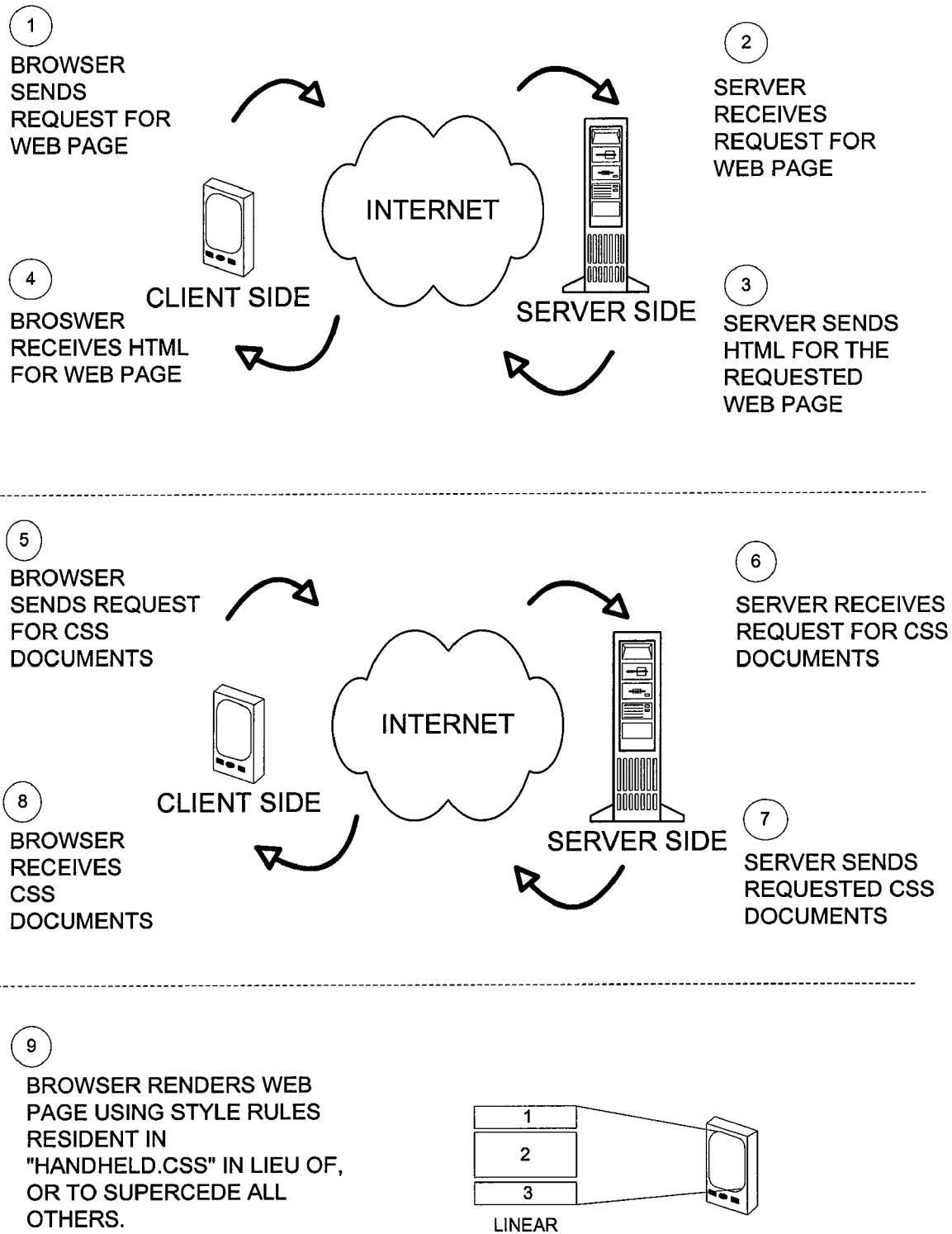
FIG. 5 illustrates a sequence of steps for rendering a web page to a small screen browser that can use the HTML <link> element to retrieve a style sheet.

FIG. 5 illustrates a sequence of steps for rendering a web page to a small screen browser (SSB) that can use the HTML <link> element to receive a style sheet. The method is a fail-safe procedure for handheld devices which accounts for browsers incapable of parsing the contents of "interference.css" to read the embedded references to "handheld.css." This method provides a reference to "handheld.css" via the HTML <link> element, with a media attribution of "handheld," which prevents high resolution browsers from processing this same instruction.

Referring to FIG. 5, the client browser sends an HTTP request to a server for a web page in step 1, which is received at the server in step 2. The server sends the HTML for the requested web page to the client browser in step 3. The client browser receives the HTML for the web page and parses the HTML in step 4. The browser sends subsequent requests for referenced style sheets in step 5. The server receives the request for CSS documents in step 6 and sends the requested CSS documents to the client browser in step 7. The client browser receives and parses the CSS documents and computes priority for style rules based upon specificity of selector and order specified in the HTML in step 8. The client browser renders the web page in step 9 using style rules resident in "handheld.css" in lieu of or to supercede all others. For this method, "handheld.css" produces a linear presentation of web page content.

Figure 6B:
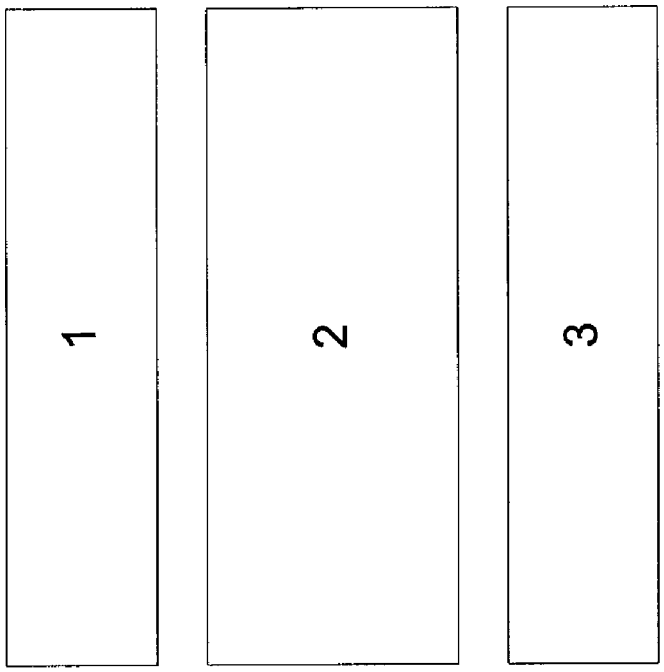
FIGS. 6A-6B illustrate how browser content can be presented in columnar order on a high resolution display and in linear order on a small screen display.
Figure 6A:
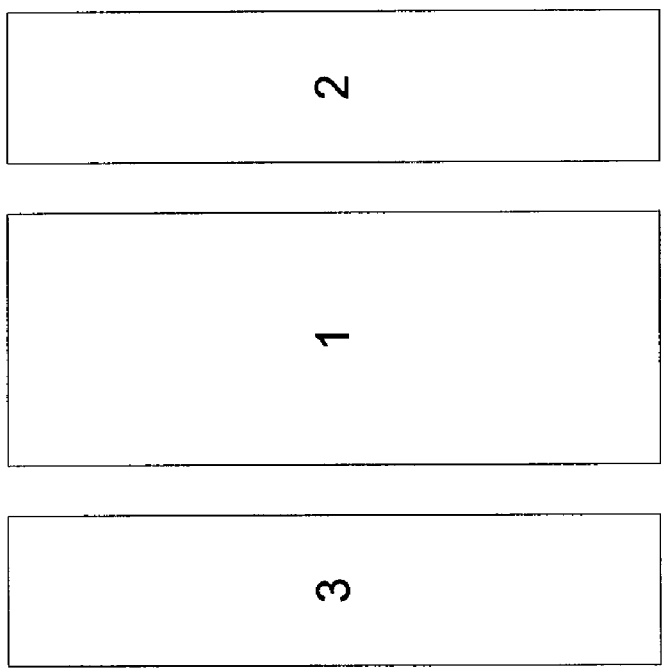

FIGS. 6A-6B illustrate how browser content can be formed from an incongruous sequence of source code and presented in columnar order on a high resolution display (FIG. 6A), and in linear order on a small screen display (FIG. 6B). Referring to FIG. 6A, using a style sheet optimized for high resolution displays, the first section (1) of content listed on the source code can be rendered visually to follow, i.e., appear to the right of, the final section (3). This source order is used to facilitate the logical ordering of content divisions on alternative displays, such as that of small screen browsers when a different style sheet is applied. Referring to FIG. 6B, either by withholding the style sheet or by applying one that is optimized for small screen browsing, the same content as in FIG. 6A exhibits the "linearized," intrinsic order of content divisions as shown in FIG. 6B.

Although the invention has been described in the context of HTML and cascading style sheets (CSS), the concepts are more broadly applicable and, as an example, extend to other markup languages and style sheets.

The system and method for delivering a device independent web page have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A method for presenting a document generated in a markup language to a plurality of device types, comprising:
providing a plurality of style sheets for formatting the document for a requesting device, with each style sheet accommodating a display environment;
receiving a request for the document from a browser of the requesting device;
sending the markup language source code for the requested document to the requesting device wherein the markup language source code includes a first link element that is used to access the style sheet for a high resolution browser, followed by a style element to reference an intermediary style sheet, wherein the intermediary style sheet includes a reference to a style sheet for a small screen browser and prevents a high resolution browser from accessing the small screen style sheet, and a second link element that is used to access the style sheet for the small screen browser;
receiving a request for a specific style sheet from the requesting device wherein the specific style sheet includes a plurality of document presentation attributes to format the document for the display environment; and
delivering the specific style sheet requested to the requesting device for rendering the document on a display screen of the requesting device.

2. The method for presenting a document page to a requesting device of claim 1 further comprising configuring and targeting markup language elements to each device type.

3. The method for presenting a document page to a requesting device of claim 2 further comprising a plurality of syntax rules for applying a style sheet to the display environment.

4. The method for presenting a document page to a requesting device of claim 3 wherein the syntax rules use the first link element to reference a high resolution style sheet for rendering the document on a high resolution display.

5. The method for presenting a document page to a requesting device of claim 4 wherein the syntax rules use the intermediary style sheet containing a reference to a small screen style sheet for rendering the document on a low resolution display.

6. The method for presenting a document page to a requesting device of claim 5 wherein the style element comprises an attribute for identifying a location of the intermediary style sheet.

7. The method for presenting a document page to a requesting device of claim 6 wherein the attribute comprises a style sheet @import notation preceded by a character that is parsed by a high resolution browser to prevent access to a small screen style sheet.

8. The method for presenting a document page to a requesting device of claim 7 wherein the @import notation includes the keyword "handheld" to reference a small screen style sheet intended for a low resolution small screen.

9. The method for presenting a document page to a requesting device of claim 5 wherein the style element comprises an HTML STYLE tag for referencing the intermediary style sheet.

10. The method for presenting a document page to a requesting device of claim 4 wherein the first link element comprises a first attribute value for identifying a location of the high resolution style sheet, and a second attribute value that is associated with the high resolution display.

11. The method for presenting a document page to a requesting device of claim 10 wherein the first attribute comprises an HTML HREF attribute and the second attribute comprises a style sheet media type.

12. The method for presenting a document page to a requesting device of claim 11 wherein a value of the style sheet media type is "screen" indicating that the document is intended for a high resolution color computer screen.

13. The method for presenting a document page to a requesting device of claim 4 wherein the first link element comprises an HTML LINK tag for referencing an external style sheet for the high resolution browser.

14. The method for presenting a document page to a requesting device of claim 4 wherein the syntax rules include use of the second link element to reference a small screen style sheet for rendering the document on a low resolution display.

15. The method for presenting a document page to a requesting device of claim 14 wherein the second link element includes a media attribute having a value "handheld" indicating that the document is intended for a low resolution small screen handheld device.

16. The method for presenting a document page to a requesting device of claim 1 wherein each of the plurality of device types has an associated screen resolution.

17. The method for presenting a document page to a requesting device of claim 1 wherein the display environment comprises a screen display for the device type.

18. The method for presenting a document page to a requesting device of claim 17 wherein the device type comprises a high resolution display for at least one of a desktop computer, a notebook computer, and a tablet personal computer.

19. The method for presenting a document page to a requesting device of claim 17 wherein the device type comprises a low resolution display for at least one of a handheld device and a smart phone.

20. The method for presenting a document page to a requesting device of claim 1 wherein the markup language is selected from a group comprising HyperText Markup Language (HTML), Extensible Markup Language (XML), Extensible HTML (XHTML), and Dynamic HTML (DHTML).

21. The method for presenting a document page to a requesting device of claim 1 wherein the plurality of style sheets comprise Cascading Style Sheets (CSS).

22. The method for presenting a document page to a requesting device of claim 1 wherein delivering the transformed document to the requesting device is performed without using either server or requesting device scripting.

23. The method for presenting a document page to a requesting device of claim 1 wherein the document comprises at least one web page.

24. A system for presenting a document generated in a markup language to a plurality of device types, comprising:
a computer processor for executing a plurality of components for delivering a device-independent web page and communicating over a computer network with a requesting device;
a memory for storing the plurality of components for delivering the device-independent web page;
a component that provides a plurality of style sheets for formatting the document for the requesting device, with each style sheet accommodating a display environment;
a component that receives a request for the document from a browser of the requesting device;
a component that sends the markup language source code for the requested document wherein the markup language source code includes a first link element that is used to access the style sheet for a high resolution browser, followed by a style element to reference an intermediary style sheet, wherein the intermediary style sheet includes a reference to a style sheet for a small screen browser and prevents a high resolution browser from accessing the small screen style sheet, and a second link element that is used to access the style sheet for the small screen browser;
a component that receives a request for a specific style sheet from the requesting device wherein the specific style sheet includes a plurality of document presentation attributes to format the document for the display environment; and
a component that delivers the specific style sheet requested to the requesting device for rendering the document on a display screen of the requesting device.

25. The system for presenting a document page to a requesting device of claim 24 further comprising a component that configures and targets markup language elements to each device type.

26. The system for presenting a document page to a requesting device of claim 25 further comprising a syntax rules component for applying a style sheet to the display environment.

27. The system for presenting a document page to a requesting device of claim 26 wherein the syntax rules component uses the first link element to reference a high resolution style sheet for rendering the document on a high resolution display.

28. The system for presenting a document page to a requesting device of claim 27 wherein the syntax rules component uses the intermediary style sheet containing a reference to a small screen style sheet for rendering the document on a low resolution display.

29. The system for presenting a document page to a requesting device of claim 28 wherein the style element provides an attribute for identifying a location of the intermediary style sheet.

30. The system for presenting a document page to a requesting device of claim 29 wherein the attribute includes a style sheet @import keyword preceded by a character that is parsed by a high resolution browser to prevent access to a small screen style sheet.

31. The system for presenting a document page to a requesting device of claim 30 wherein the @import notation includes the keyword "handheld" to reference a small screen style sheet intended for a low resolution small screen handheld device.

32. The system for presenting a document page to a requesting device of claim 28 wherein the style element includes an HTML STYLE tag for referencing the intermediary style sheet.

33. The system for presenting a document page to a requesting device of claim 27 wherein the first link element provides a first attribute value for identifying a location of the high resolution style sheet, and a second attribute value that is associated with the high resolution display.

34. The system for presenting a document page to a requesting device of claim 33 wherein the first attribute includes an HTML HREF attribute and the second attribute comprises a style sheet media type.

35. The system for presenting a document page to a requesting device of claim 34 wherein a value of the style sheet media type is "screen" indicating that the document is intended for a high resolution color computer screen.

36. The system for presenting a document page to a requesting device of claim 27 wherein the first link element includes an HTML LINK tag for referencing an external style sheet for the high resolution browser.

37. The system for presenting a document page to a requesting device of claim 27 wherein the syntax rules component uses the second link element to reference a small screen style sheet for rendering the document on a low resolution display.

38. The system for presenting a document page to a requesting device of claim 37 wherein the second link element includes a media attribute having a value of "handheld" indicating that the document is intended for a low resolution small screen handheld device.

39. The system for presenting a document page to a requesting device of claim 24 wherein each of the plurality of device types has an associated screen resolution.

40. The system for presenting a document page to a requesting device of claim 24 wherein the display environment comprises a screen display for the device type.

41. The system for presenting a document page to a requesting device of claim 40 wherein the device type includes a high resolution display for at least one of a desktop computer, a notebook computer, and a tablet personal computer.

42. The system for presenting a document page to a requesting device of claim 40 wherein the device type includes a low resolution display for at least one of a handheld device and a smart phone.

43. The system for presenting a document page to a requesting device of claim 24 wherein the markup language is selected from a group comprising HyperText Markup Language (HTML), Extensible Markup Language (XML), Extensible HTML (XHTML), or Dynamic HTML (DHTML).

44. The system for presenting a document page to a requesting device of claim 24 wherein the plurality of style sheets are Cascading Style Sheets (CSS).

45. The system for presenting a document page to a requesting device of claim 24 wherein the component that delivers the transformed document to the requesting device does not use server or requesting device scripting.

46. The system for presenting a document page to a requesting device of claim 24 wherein the document comprises at least one web page.

47. A computer program product for presenting a document generated in a markup language to a plurality of device types when executed on a computer processor comprising a non-transitory computer readable storage medium having computer readable code embedded therein, the non-transitory computer readable storage medium comprising:
   program instructions that provide a plurality of style sheets for formatting the document for a requesting device, with each style sheet accommodating a display environment;
   program instructions that receive a request for the document from a browser of the requesting device;
   program instructions that send the markup language source code for the requested document wherein the markup language source code includes a first link element that is used to access the style sheet for a high resolution browser, followed by a style element to reference an intermediary style sheet, wherein the intermediary style sheet includes a reference to a style sheet for a small screen browser and prevents a high resolution browser from accessing the small screen style sheet, and a second link element that is used to access the style sheet for the small screen browser;
   program instructions that receive a request for a specific style sheet from the requesting device wherein the specific style sheet includes a plurality of document presentation attributes to format the document for the display environment; and
   program instructions that deliver the specific style sheet to the requesting device for rendering the document on a display screen of the requesting device.

48. The computer program product for presenting a document page to a requesting device of claim 47 further comprising program instructions that configure and target markup language elements to each device type.

49. The computer program product for presenting a document page to a requesting device of claim 48 further comprising program instructions that provide a plurality of syntax rules for applying a style sheet to the display environment.

50. The computer program product for presenting a document page to a requesting device of claim 49 wherein the program instructions that provide syntax rules use the first link element to reference a high resolution style sheet for rendering the document on a high resolution display.

51. The computer program product for presenting a document page to a requesting device of claim 50 wherein the first link element includes an HTML LINK tag for referencing an external style sheet for the high resolution browser.

52. The computer program product for presenting a document page to a requesting device of claim 50 wherein the syntax rules include use of the second link element to reference a small screen style sheet for rendering the document on a low resolution display.

53. The computer program product for presenting a document page to a requesting device of claim 49 wherein the program instructions that provide syntax rules use the intermediary style sheet containing a reference to a small screen style sheet for rendering the document on a low resolution display.

54. The computer program product for presenting a document page to a requesting device of claim 53 wherein the first link element includes a first attribute value for identifying a location of the high resolution style sheet, and a second attribute value that is associated with the high resolution display.

55. The computer program product for presenting a document page to a requesting device of claim 53 wherein the style element includes an attribute for identifying a location of the intermediary style sheet.

56. The computer program product for presenting a document page to a requesting device of claim 55 wherein the attribute includes a style sheet @import notation preceded by a character that is parsed by a high resolution browser to prevent access to a small screen style sheet.

57. The computer program product for presenting a document page to a requesting device of claim 56 wherein the @import notation includes the keyword "handheld" to reference a small screen style sheet intended for a low resolution small screen handheld device.

58. The computer program product for presenting a document page to a requesting device of claim 53 wherein the style element includes an HTML STYLE tag for referencing the intermediary style sheet.

59. The computer program product for presenting a document page to a requesting device of claim 47 wherein each of the plurality of device types has an associated screen resolution.

60. The computer program product for presenting a document page to a requesting device of claim 47 wherein the display environment comprises a screen display for the device type.

61. The computer program product for presenting a document page to a requesting device of claim 60 wherein the device type includes a high resolution display for at least one of a desktop computer, a notebook computer, and a tablet personal computer.

62. The computer program product for presenting a document page to a requesting device of claim 60 wherein the device type includes a low resolution display for at least one of a handheld device and a smart phone.

63. The computer program product for presenting a document page to a requesting device of claim 47 wherein the markup language is selected from a group comprising HyperText Markup Language (HTML), Extensible Markup Language (XML), Extensible HTML (XHTML) and Dynamic HTML (DHTML).

64. The computer program product for presenting a document page to a requesting device of claim 47 wherein the first attribute includes an HTML HREF attribute and the second attribute includes a style sheet media type.

65. The computer program product for presenting a document page to a requesting device of claim 64 wherein a value of the style sheet media type is "screen" indicating that the document is intended for a high resolution color computer screen.

66. The computer program product for presenting a document page to a requesting device of claim 65 wherein the second link element includes a media attribute having a value "handheld" indicating that the document is intended for a low resolution small screen handheld device.

67. The computer program product for presenting a document page to a requesting device of claim 47 wherein the plurality of style sheets are Cascading Style Sheets (CSS).

\* \* \* \* \*